March 29, 1960  A. D. HERMAN  2,930,397
PRESSURE FILL LIMITER, THERMO RELIEF AND DUMP
VALVE FOR PRESSURIZED VESSELS Filed April 8, 1957  2 Sheets-Sheet 1

INVENTOR.
ALBERT DALE HERMAN
BY
Sellers and Latta
—ATTORNEYS—

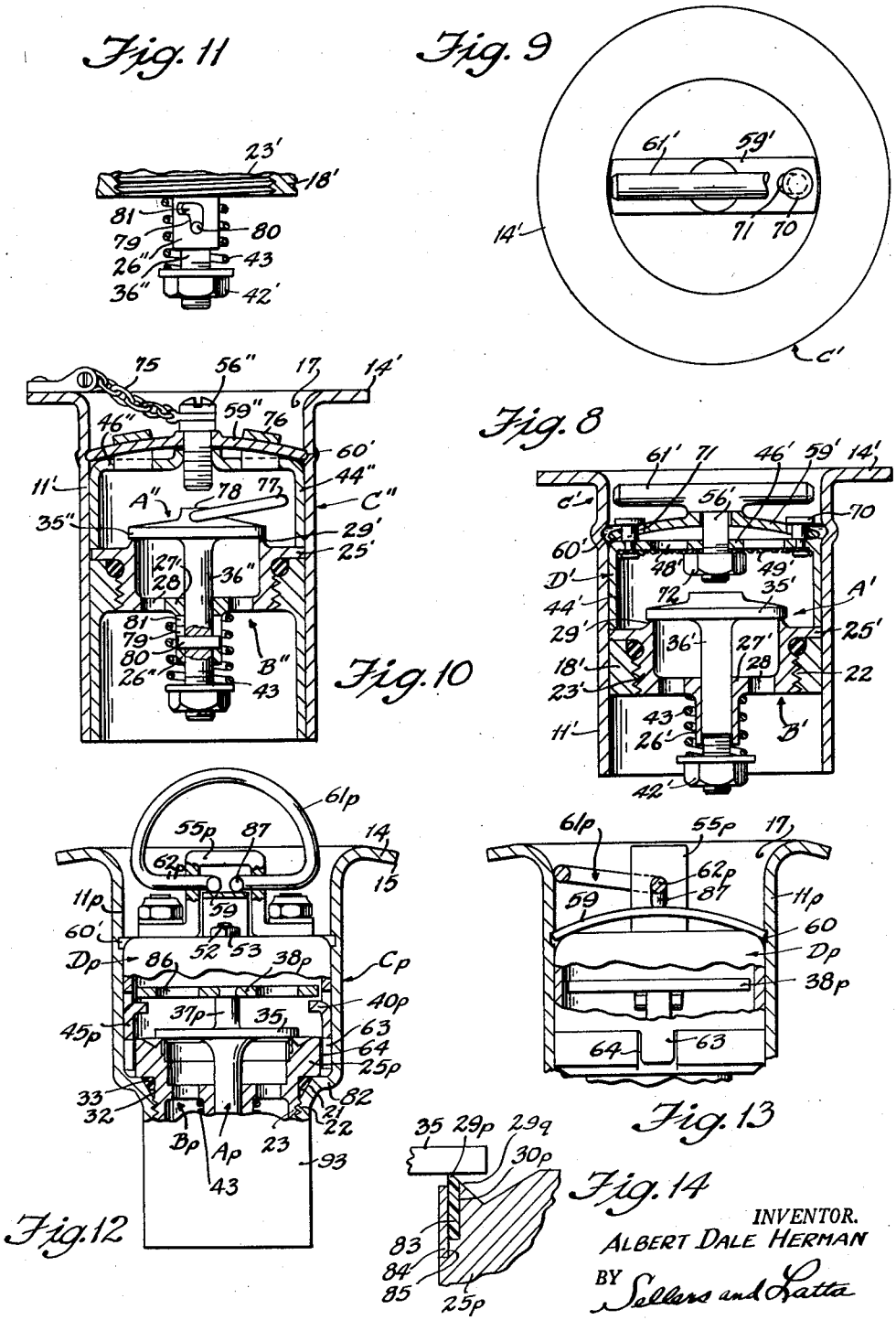

United States Patent Office 2,930,397
Patented Mar. 29, 1960

2,930,397

PRESSURE FILL LIMITER, THERMO RELIEF AND DUMP VALVE FOR PRESSURIZED VESSELS

Albert Dale Herman, Encino, Calif., assignor, by mesne assignments, to Aeroquip Corporation, a corporation of Michigan Application April 8, 1957, Serial No. 651,415

16 Claims. (Cl. 137—382)

This invention relates generally to valves for pressurized vessels such as containers for compressed air, and has as its general object to provide an improved tri-purpose valve for performing the following main functions: (a) pressure fill limiting; (b) thermal relief; and (c) fast acting dump for discharge of the contents of the vessel.

A particular object of the invention is to provide a valve having a high degree of accuracy in limiting the pressure of a gas within a vessel, to a very close tolerance (e.g. as close as ¼ lb. per square inch) particularly for use in pressurized vessels of lightweight construction. In applications of pressurized containers to certain installations such as in aircraft, very stringent requirements for close tolerances in the limiting of pressure within the container have been engendered by the demand for the complete elimination of all excess weight in the container beyond that required to maintain a suitable safety factor in the containment of a prescribed pressure within the container. To meet these requirements, the invention provides a pressure limiting valve adapted to function to maintain a precise limit on the pressure of a gas being pumped into a container by discharging excess gas from the container through a pressure relief port separate from an inlet through which the gas is being pumped into the container; also functioning to relieve any excess pressure developed by a rise in temperature.

A further object is to provide, in such a pressure relief valve, a manually operable means for overriding the pressure responsive normal valve closing means, for holding the valve in a wide-open position for rapid dumping of the pressurized fluid from the vessel.

Another object is to provide such a valve in a cartridge form for easy installation in a container, and accommodating ready removal of the valve assembly from the container.

A further object is to provide such a valve assembly which is of all metal construction except for a gasket for sealing the valve seat to the valve casing.

Another object is to provide such a valve that is non-corrosive.

Another object is to provide a valve having a large flow capacity in a small envelope.

A further object is to provide a valve which in addition to the characteristics outlined above, may be easily installed and removed without the use of special tools.

Another object is to provide a valve combining the above outlined characteristics in a construction that is quite simple, inexpensive and yet very sturdy and durable.

Other objects and advantages will become apparent in the ensuing specifications and appended drawings in which:

Fig. 8 is an axial sectional view of a valve embodying a modified form of the invention;

Fig. 9 is a plan view of the same;

Fig. 10 is an axial sectional view of a valve embodying another modified form of the invention;

Fig. 11 is a fragmentary view, partially in section, showing in elevation the valve mounting of Fig. 10;

Fig. 12 is an axial sectional view of a valve embodying another modified form of the invention;

Fig. 13 is a fragmentary view of the same, partially in section and partially in elevation, with parts broken away; and Fig. 14 is an enlarged detail sectional view of the valve seat of Fig. 12.

Figure 1:
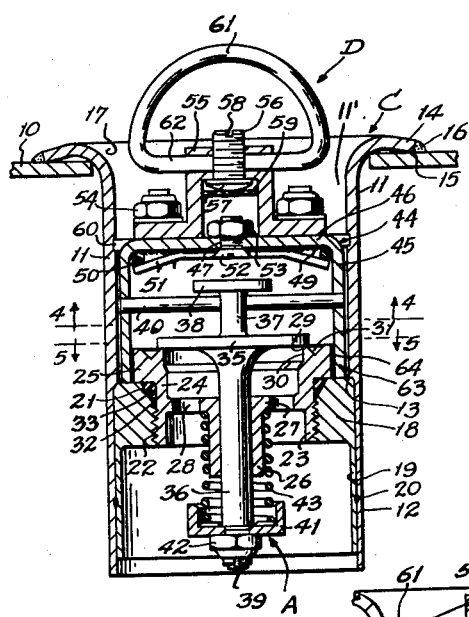
Fig. 1 is an axial sectional view of a valve embodying the invention.

Referring now to the drawings in detail, I have shown therein, in the several examples of various forms in which the invention may be embodied, a valve assembly for installation in a pressurized contained indicated at 10, said assembly comprising generally a valve piston unit A cooperating with a seat unit B which is mounted in a casing C, and a cover unit D.

*The invention as disclosed in Figs. 1–7*

In this form of the invention, unit D is a combined cover and manual actuator. The casing C consists essentially in a cylindrical sleeve including the relatively thick wall portion 11 at one end thereof and, at the other end, a portion 12 of reduced thickness, an annular shoulder 13 being defined between these sections substantially midway between the ends of the casing, and a welding flange 14 being formed at the end of casing section 11. The flange 14 is return-bent toward the opposite end of the casing, with a low-angle frusto conical configuration so as to present a welding edge 15 adapted to make circular line contact with a flat outer surface of a container 10 having an opening through which the casing body extends. An annular welded seam 16 joins and pneumatically seals the periphery of flange 14 to the tank 10. Alternatively, for containers of non-metallic material, such as fiber glass containers, the flange 14 may be cemented to the container. The open outer end of casing C defines a throat 17 for discharge of fluid from container 10 through the valve. The inside walls of the casing 11 define a cylindrical chamber of circular cross section, open to the throat 17, and serving to receive the cover unit D.

A mounting collar 18, having an integral cylindrical skirt 19, is snugly mounted within the section 12 of the valve casing and is secured and sealed pneumatically thereto by a roll-welded seam 20 extending therearound.

Mounting collar 18 is provided with a frusto-conical gasket seat 21. From the inner extremity of seat 21, a female thread 22 defines a threaded bore in which is mounted a threaded nipple 23 of the valve seat unit B, having a tubular waist section 24 and a head 25 which is in the form of a radial flange of generally square cross section. The valve seat unit B further includes an integral cylindrical bearing bushing 26 one end of which is integrally joined to the waist section 24 by an apertured spoked spider 27 defining a plurality of fluid passage ports 28 therein. The valve seat unit further includes a valve seat 29 in the form of a circular knife edge defined between a counterbored cylindrical inner wall 30 and a frusto-conical countersunk wall 31 constituting one side of an annular groove in the end face of the head 25.

Valve seat unit B is of a non-corrosive, moderately soft metal such as bearing bronze, whereas the casing and mounting collar parts 11, 12, 18 etc., may be of lightweight aluminum alloy or mild steel or the like. Defined between the waist section 24, the head 25 and the end of the thread of nipple 23 is an annular groove 32 of uniform radial cross section around the circumference of the valve seat unit. An O-ring gasket 33 is seated in the annular groove 32 and is interposed under compression between the waist section 24 and the gasket seat 21. Head 25 is seated against the flat radial end face 34 of the mounting collar 18 in order to accurately establish the position of the valve seat 29 in an axial direction within the valve casing. The end face 34 abuts against the shoulder 13 of the casing 11 to establish the positioning of the mounting collar 18 in the casing.

Valve piston unit A is of a non-corrosive metal such as stainless steel which may have a fairly wide range of hardness (e.g. from 20 Rockwell up to 50 Rockwell or harder) depending upon service requirements in various situations although it is preferably in all cases somewhat harder than the material of valve seat parts 23—31. The valve disc 35 and valve seat 29 may be formed by conventional lathe machining operations, although with careful attention to close tolerances, particularly as to squareness (accuracy of location of the planes of the respective contacting surfaces of valve 35 and seat 29 normal to the respective axes of the valve unit and the valve seat unit respectively). In the operation of assembling the valve structure, the valve disc 35 is lapped to the seat 29.

The valve piston unit A includes a valve head 35, in the form of a solid flat circular disc, adapted to normally engage the seat 29 to close the fluid passage through the valve structure; a stem 36 extending from one side of head 35 and snugly mounted in the bearing bushing 26 for sliding movement, a neck 37 extending from the other side of the valve head 35, and a knob 38 which is axially spaced from the valve disc 35 and joined thereto by neck 37, whereby there is defined between the neck 37 the valve disc 35 and the knob 38, an annular groove which receives a valve lifter bar 40. At the opposite end of the valve unit A the stem 36 is provided with a reduced, threaded tip 39. A spring retainer washer 41, of cup shape, is positioned over the tip 39 and secured against the shouldered end of stem 36 by a cap nut 42 threaded onto tip 39. A light coil spring 43 is engaged under compression between the retainer washer 41 and the spider 27 of the valve seat part. The spring 43 normally retains the valve in seating contact with valve seat 29 and determines the pressure at which the valve 35 will lift to allow the escape of excess pressurized fluid from the tank 10.

Cover unit D, including a cover 44, serves the triple function of (a) covering the valve mechanism to protect it against dust, etc. (b) providing for manual actuation of the valve to a dump position, and (c) functioning as a spanner wrench for assembly and removal of unit B. Cover 44 includes a cylindrical skirt portion 45 which is loosely received within the section 11 of the valve casing, and a flat end part 46 which has a central aperture 47 and a pair of arcuate breathing ports 48. The ends of lifter bar 40 are mounted in skirt 45. To prevent the passage of dust etc., from the external atmosphere into the valve mechanism, and to prevent the outward blowing of any material from the tank through the valve and into the face of an operator, the breathing ports 48 are traversed by a flat annular filter screen 49 having a slightly dished rim portion fitted into the annular corner of the cover 44 and held by a metal retainer ring 50. Retainer ring 50 in turn is secured by a star washer 51 which is secured to the end member 46 by a small bolt 52 extending through the aperture 47, a nut 53 being attached to the outer end of the bolt 52.

Figure 6:
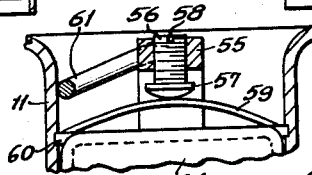
Fig. 6 is a fragmentary sectional view showing the cover locked.

Attached to cover end member 46, as by means of fasteners 54, is a bracket in the form of a clevis 55 in the center of which is a threaded opening receiving a locking screw 56. Locking screw 56 has a head 57 at its inner end, and a screw driver slot 58 at its outer end. Head 57 bears against the central area of a locking bolt in the form of a bowed leaf spring bar 59 the ends of which are normally engaged in an annular shallow retainer groove 60 in the inner wall of casing section 11. By rotating screw 56 to retract it, the bar 59 is released for contraction to a normally bowed condition in which its ends are withdrawn from the retainer groove 60, thus permitting the cover 44 to be retracted outwardly in casing 11. Such retraction of the cover 44 is provided for by a bail handle 61 having end trunnions 62 that are pivotally mounted in the central portion of the clevis 55. The body of handle 61 is roughly of semi-circular form, trunnions 62 extending from a diameter thereof, and the handle 61 may thus be moved to a folded position in which it is disposed within the upper end space of casing 11, roughly concentric to the wall section 11 of the casing. Handle 61 is arched to a somewhat greater radial height in the center than at its sides, so that the central portion thereof may contact the throat of casing 11, as shown in Fig. 6. When locking screw 56 is advanced inwardly and tightened against the center of locking bar 59, the bar 59 is flattened so that the ends thereof, functioning as locking bolts, are projected outwardly into retainer groove 60, in locking engagement with a locking shoulder which defines the side of groove 60 adjacent throat 17, the adjoining end portions of bar 59 bearing against opposite sides of end member 46 to secure the cover 44. The fulcruming of these end portions of bar 59 against end member 46 positions them to guide their ends into groove 60.

The fully tightened position of bar 59 is one in which the center thereof is seated against the outer end of bolt 52 which serves as an abutment seat for the spring.

Locking bar 59 is retained against endwise displacement, when relaxed, by means of shoulder elements 59' formed integrally thereon and projecting laterally, and abutting opposite sides of the legs of clevis 55.

Alternatively, locking bar 59 may have at its center an aperture receiving a small pilot 57' projecting from the center of head 57, and the normal arching of bar 59 may be sufficient to maintain this piloting connection to the point where heat 57 has been fully retracted to a limit position determined by its engagement with the clevis 55 (Figs. 1 and 2) so that the locking bar will be retained in assembly at all times.

The tightening of the ends of locking bolt 59 in groove 60 results in the centering of cover 44 on the axis of the valve casing, and this in turn produces a radial pressure from clevis 55 through handle 61 against the throat of casing 11 which locks the handle 61 in the folded position. In order to release the handle for movement to its operative position, it is necessary to back off the locking screw 56 sufficiently to allow a lateral tilting of the cover 44 to an extent permitted by the spacing between its skirt 45 and the casing section 11.

At its inner end, casing section 45 has a pair of diametrically opposed axially extending lugs 63 which normally extend axially through notches 64 in the periphery of valve seat head 25 and rest against the end face of mounting collar 18 as shown in Fig. 1. The height of lugs 63 is just slightly less than the axial height of head 25, so that the margin of skirt 45 will be substantially closed against the end face of head 25 in the closed position of cover 44.

For insertion and removal of valve seat unit B, cover D is used as a spanner wrench, the lugs 63 engaging the seat head 25 in notches 64 and transmitting rotation that is imparted to the cover 44 through handle 61.

By unlocking the ends of locking bolt 59 from groove 60 and lifting on handle 61, cover 45 may be raised sufficiently so that the ends of lugs 63 may clear the end face of valve seat head 25. In moving the cover 44 to this position, the valve lifting bar 40 will engage the knob 38 of the valve piston A and unseat the valve. By then rotating the cover 44 to a position in which the fingers 63 are out of registration with the notches 64 and releasing the cover, the ends of the lugs 63 will be seated against the flange 25 of the valve seat unit, thus supporting the valve in its open position. In this position, the contents of the vessel may be rapidly dumped through the valve, the valve head 35 being held in a position substantially spaced from the valve seat 29.

While I prefer to utilize the all metal valve and seat arrangement shown and described herein, the other features of the invention, described above and hereinafter claimed, can be embodied and utilized quite satisfactorily for many installations, especially in the lower temperature ranges, in valves having conventional gasket sealing rings in the seat or valve head.

*Modified form—Fig. 8*

In the modified form of the invention shown in Figs. 8 and 9, the valve casing C' is of construction similar to the casing C, and supports a mounting collar 18' which is secured therein as by sweating, or by a press fit. The valve seat unit B' is generally similar in construction to the unit B of Fig. 1, incorporating parts 23', 25', 26', 27' and 29' which are broadly similar to the parts designated by the corresponding numerals (without the primed exponents) in Fig. 1, the fluid passage ports 28 being provided as in the form shown in Fig. 1. The cover and actuator unit D' includes a cover 44' of cup shape, generally similar to the cover 44 of Fig. 1, having the breathing ports 48' with a screen 49' traversing the same. A leaf spring locking bar 59' is guided at its ends by the rivets 70 extending through apertures 71 therein, its ends being engageable in an annular groove 60'. The handle unit 61' is in this instance a rigid handle on the outer end of a screw stud 56' which is threaded into a nut 72 secured to the inner side of end member 46' of the cover. The hub of handle 61' bears against the center of bar 59' to compress the same so that its ends will establish locking engagement in groove 60' as hereinbefore described for the form of the invention shown in Fig. 1.

Figure 4:
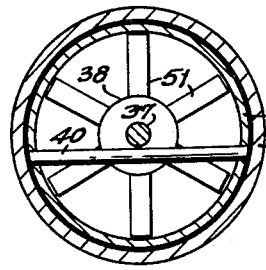
Fig. 4 is a transverse sectional view taken on the line 4—4 of Fig. 1.
Figure 3:
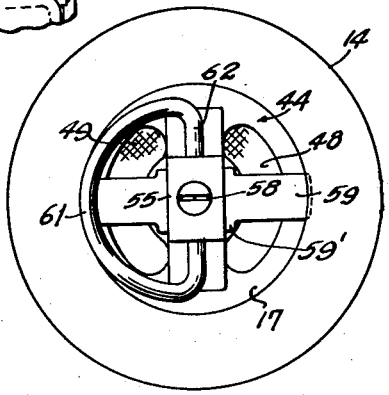
Fig. 3 is a plan view of the valve.
Figure 5:
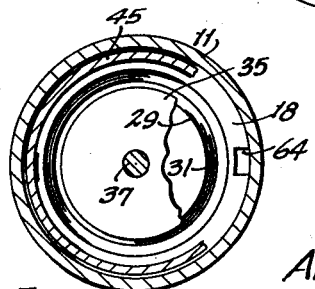
Fig. 5 is a transverse sectional view taken on the line 5—5 of Fig. 1.
Figure 7:
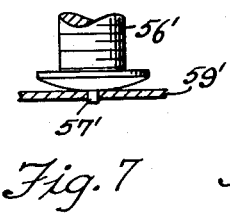
Fig. 7 is a fragmentary sectional view of a modified form of locking bar retainer arrangement.

In the modified form of the invention shown in Fig. 10, the components including casing C" and valve seat unit B" are substantially the same as in Fig. 4 and the parts thereof are therefore indicated by the same reference numerals. The cover unit D" in this case differs from the arrangement shown in Fig. 4 in that the spring operating screw 56" is of simple screw design, has a conventional slotted head, and is provided with a captive connection which may be constituted by a chain 75 linking the neck of the screw to the flange 14' of the casing C". The arrangement further differs in that the ends of locking bar 59" are guided in loops or eyes 76 struck upwardly from the end member 46" of the cover 44".

The valve unit A" differs from the valve A' of Fig. 4 in having a handle 77 in the form of a bail pivotally attached to a short stud 78 on the upper end of the valve.

The valve seat unit B" differs in that the bearing bushing 26" is provided with a pair of bayonet slots 79 in which a cross pin 80, extending through and mounted in the stem 36" of the valve unit A, has its ends engageable selectively in the bottom portions of such bayonet slots or in horizontal portions 81 thereof (Fig. 11), whereby the valve unit A" may be supported in its open, dumping position.

*The preferred form of the invention as disclosed in Fig. 12*

As a preferred form of the invention, Fig. 12 discloses a modified arrangement wherein the valve casing Cp is necked down with an annular shoulder 82 to provide a reduced integral collar portion 93 having internal threads 22 into which the threaded nipple portion 23 of seat unit Bp is threaded. Seat unit Bp is the same as the unit B of Fig. 1 with the exception that the valve seat is formed as the beveled edge of a cylindrical sleeve 83 of a tough, wear resistant plastic material such as nylon or Teflon which is mounted in encircling relation to the cylindrical wall 30p of the head 25p (Fig. 14) the latter having an annular beveled bead 29q backing up the beveled seat edge 29p in a manner such that, in the event the seat 29p is flattened by the valve head 35 to the plane of the bead 29q, then the valve head 35 will seat against the latter to maintain the pneumatic seal, the bead 29q thus becoming a secondary seat.

The sleeve 83 is retained by a cylindrical collar 84 which is snugly received therein and seated on a shoulder 85 in the seat head 25p. The annular bead 29q projects slightly above the end of retainer collar 84 so that the latter will not interfere with the seating of valve head 35 against bead 29q.

The cover unit Dp is the same as the cover unit D of Fig. 1 with the exception that a pair of lifter fingers 40p are formed as integral portions of skirt 45p, being struck inwardly therefrom in a lancing operation. The breathing apertures and filter screen arrangement of Fig. 1, secured by a bolt 52 and nut 53, is incorporated, as well as the other parts shown as indicated by the same reference numerals as in Fig. 1.

The valve unit Ap is the same as that of Fig. 1 with the exception that the stem 37p is riveted into the center of a lifter knob which is in the form of a disc 38p having a diameter just slightly smaller than the inner diameter of skirt 45p and extending in overhanging relation to the lifter fingers 40p. Disc 38p is provided with ports 86 to accommodate free passage of air therethrough.

The locking bolt 59 is substantially the same as in Fig. 1, but instead of the actuator screw 56 of Fig. 1, there is provided one or more actuator cams 87 formed on one or more of the trunnions 62p of the handle bail 61p. The ends of cams 37 may be squared or otherwise formed with high points passing over center in the locking operation in which bail 61p is moved downwardly into the throat 17 to the position shown in Fig. 13, whereby the locking bolt 59, having been flattened, will exert a spring load against the cams 87 with an overcenter locking effect which will retain the bail 61p securely in this position in which its central part bears against the wall of throat 17 as shown in Fig. 13. Thus the assembly is securely locked against accidental release of the cover unit Dp.

Figure 2:
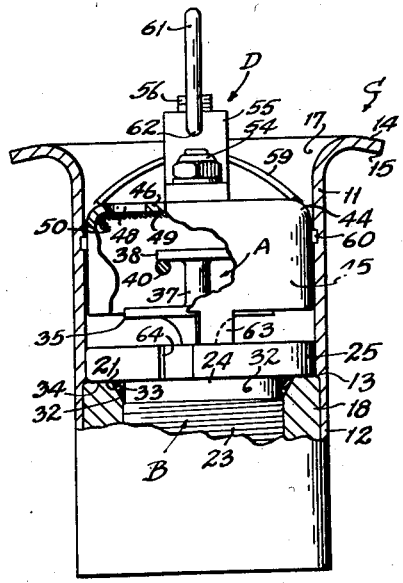
Fig. 2 is a side view, partially in section, showing the valve in dumping position.

By lifting the bail 61p to the position shown in Fig. 12, the pressure against locking bolt 59 is relaxed, allowing the ends of the bolt to be withdrawn from the locking groove 60, and thus releasing the entire assembly of cover unit Dp so that it may be lifted and rotated to the dumping position shown for unit D in Fig. 2.

The clevis 55p differs from the clevis 55 of Fig. 1 in that the bearing bores for trunnion 62p are located below the head of the clevis instead of in the head. Thus the cams 87 operate in the space beneath the clevis head. In constructing the apparatus, the trunnions 62p, in straight form without the cams 87 being formed on the ends thereof, may first be inserted through the bearing bores of the clevis, and may subsequently be subjected to a die-forming operation to form the cams 87 as integrally bent end portions thereof.

I claim:

1. In a combined pressure relief and dump valve, in combination: a tubular valve casing of circular cross section having an open end defining a discharge throat; means in said casing defining a valve seat facing said throat; a slide bearing mounted centrally in said casing, with a fluid port defined between said bearing and said seat; a poppet valve including a stem slidably mounted in said bearing and a head in axially opposed relation to said seat; means yieldingly loading said valve toward closed position; and a cover positioned between said poppet valve head and said open end of the casing, said cover including a skirt loosely fitted within said casing and having an open inner end encircling said valve and an outer end member facing said throat and provided with a breathing port, a filter screen attached to said outer end member and covering said breathing port, and means on the cover for engaging the casing to releasably hold the cover in the casing.

2. In a combined pressure relief and dump valve, in combination: a valve casing of circular cross section having an open end defining a discharge throat and having at said open end a radially outwardly projecting flange for attachment of said casing to a container wall with the casing projecting through an opening in said wall; means in said casing defining a metal valve seat of annular knife edge form projecting toward said throat; a slide bearing mounted centrally in said casing, with a fluid port defined between said bearing and said seat; an all metal poppet valve piston including a valve head in opposed relation to said valve seat and an integral stem projecting from the center of said valve head and slidably mounted in said bearing; and a cover of dome shape positioned between the poppet valve and said open end of the casing, said cover including a skirt loosely fitted within said casing and having an open inner end encircling said valve and an outer end member facing said throat and provided with a breathing port, means on the cover for engaging the casing to releasably hold the cover in the casing, a filter screen sealed against the inner face of said end member and covering said breathing port, a retainer ring securing the peripheral portion of said screen against said inner face, a star washer holding said retainer ring in place, and a fastener extending through the center of said end member and securing the center of said star washer in flexed condition, spring loading said retainer ring against said screen.

3. In a combined pressure relief and dump valve, in combination: a tubular valve casing of circular cross section having an open end defining a discharge throat, the casing having a groove formed in the inside wall thereof; means in said casing defining a valve seat facing said throat and spaced axially inwardly from said groove; a slide bearing mounted centrally in said casing, with a fluid port defined between said bearing and said seat; a poppet valve including a stem slidably mounted in said bearing and a head in axially opposed relation to said seat; a coil spring encircling said stem, engaged under compression between said seat means and the end of said stem and holding said valve head in fluid sealing engagement with said seat at pressures in said port below a selected yield pressure; a cover including a skirt loosely fitted within said casing and an end member facing said throat and provided with a breathing port, and means on the cover engageable in said groove to releasably hold the cover in the casing; means providing a lost motion valve lifting connection between said cover and said valve piston; and means rendered operative by rotational indexing of said cover to support the cover in a lifted position, thereby to support the valve in an unseated dumping position.

4. In a combined pressure relief and dump valve, in combination: a tubular valve casing of circular cross section having an open end defining a discharge throat and having at the base of said throat a shallow radial annular locking shoulder facing inwardly away from said throat, means in said casing defining a valve seat facing said throat and spaced axially inwardly from said locking shoulder, and a slide bearing fixed centrally in said casing, with a fluid port defined between said bearing and said seat; a poppet valve including a stem slidably mounted in said bearing and a head in axially opposed relation to said seat; a coil spring encircling said stem, engaged under compression between the inner end of said stem and said seat means and holding said valve head in fluid sealing engagement with said seat at pressures in said port below a selected yield pressure; a cover including a skirt loosely fitted within said casing and an end member facing said throat and provided with a breathing port; means providing a lost motion valve lifting connection between said cover and said valve piston; means rendered operative by rotational indexing of said cover to support the cover in a lifted position, thereby to support the valve in an unseated dumping position; a locking bolt of low-spring form, having end portions fulcrumed against the outer end of said cover and thereby positioned for engagement beneath said locking shoulder; a bracket attached externally to said cover end member and including a part overhanging the center thereof; and actuator means acting between said bracket and the central portion of said bolt for flattening the bolt to project the ends thereof beneath said locking shoulder, thereby to lock said cover in fixed relation to said valve seat means.

5. A valve as defined in claim 4, wherein said actuator means comprises: a locking screw threaded through said overhanging part of the bracket and having an inner end bearing against said central portion of the locking bolt.

6. A valve as defined in claim 4, including a handle bail having end trunnions pivotally mounted in said bracket, for hinging movement of the bail from a position projecting axially out of said throat for use in lifting the cover, to a folded position extending radially within said throat; said actuator means comprising a cam on the inner end of one of said trunnions, engageable with said locking bolt to flatten it when said bail is moved to said folded position.

7. A valve as defined in claim 4, wherein said rotational indexing means comprises a plurality of peripheral recesses formed in the valve seat head and a plurality of axially projecting lugs on said cover skirt at the open end of the skirt normally received in said recesses to allow said cover to be closely associated with said valve seat head, said lugs being adapted to rest against said valve seat head upon lifting the cover and rotating the same, whereby to hold the cover in the position in which said valve is unseated.

8. A valve as defined in claim 4, wherein said rotational indexing means comprises a plurality of peripheral recesses formed in the valve seat head and a plurality of axially projecting lugs on said cover skirt at the open end of the skirt normally received in said recesses to allow said cover to be closely associated with said valve seat head, said lugs being adapted to rest against said valve seat head upon lifting the cover and rotating the same, whereby to hold the cover in the position in which said valve is unseated, said lugs constituting a spanner wrenching connection between said cover and said valve seat unit for assembling and detaching the same to and from the casing, and a bail handle having end trunnions pivotally attached to said cover end member for shifting the handle between a position extending radially from the valve piston axis and contained within said throat, and a position extending axially outwardly through said throat, where it is operative for transmitting either lifting movement or rotational movement to said cover.

9. In a combined pressure relief and dump valve, in combination: a tubular valve casing of circular cross section having an open end defining a discharge throat and having at the base of said throat a shallow radial locking shoulder facing inwardly away from said throat, said casing having an internal threaded collar spaced axially inwardly from said shoulder; a valve seat unit including a nipple threaded into said collar, a head projecting radially outwardly from the diameter of said nipple and having a substantially radial shoulder seated against the end of said collar, having a metal valve seat of annular knife edge form projecting toward said throat, and including a centrally disposed slide bearing and a spider joining said nipple to the end of said bearing facing said throat, said spider having a port therein; an all metal poppet valve piston including a valve head in opposed relation to said valve seat and an integral stem projecting from the center of said valve head and slidably mounted in said bearing; a coil spring encircling said stem and bearing, engaged under compression between said spider and the end of said stem and holding said valve head in fluid sealing engagement with said seat at pressures in said port below a selected yield pressure; a cover including a skirt loosely fitted within said casing between said locking shoulder and said valve seat head, and an end member facing said throat and provided with a breathing port, a locking bolt of bowed spring bar form, having end portions fulcrumed against the outer end of said cover and thereby positioned for engagement beneath said locking shoulder; and a locking screw having a threaded connection with said end member and in pressure transmitting relation to the center of said bolt locking bar, for flattening the latter to project the ends thereof beneath said locking shoulder.

10. A valve as defined in claim 9, wherein said locking screw is extended through an opening in the center of said bowed spring and has a head engaging said bow spring and, at its other end, a threaded shank threaded through the center of said end member of the cover, and wherein said locking screw head is extended to form a handle for lifting said cover.

11. A valve as defined in claim 9, including a bail handle attached to the outer end of said valve piston, normally disposed in a position extending generally radially from the axis thereof and adapted to be lifted to an axially extending position when said cover is removed, for lifting the valve to a dumping position; a pin extending through said valve stem and engaged in bayonet slots in said bearing, and adapted upon rotation of said valve after it has been lifted, to lock said valve in the unseated dumping position.

12. In a combined pressure relief and dump valve, in combination: a tubular valve casing of circular cross section having an open end defining a discharge throat, having at the base of said throat a shallow radial annular locking shoulder facing inwardly away from said throat, and having at its said outer end a radially outwardly extending flange for attachment of said casing to a container having an opening through which said casing extends, and said casing having an internally threaded locking collar faced axially inwardly from said locking shoulder; a valve seat unit including a nipple threaded into said collar, a tubular waist section projecting outwardly from said nipple, a head projecting radially outwardly from said waist section and having a substantially radial shoulder seated against the end of said collar and an annular knife edge part projecting toward said throat and providing a metal valve seat, said seat unit including a centrally disposed bearing bushing and a spider joining the outer end of said bushing to said waist section and having a fluid port therein; a gasket interposed between said waist section and said collar and hermetically sealing said seat unit in said casing; an all metal poppet valve piston including a valve head in opposed relation to said valve seat and an integral stem projecting from the center of said head and slidably mounted in said bearing; a retainer washer attached to the inner end of said stem; a coil spring encircling said stem and bearing, engaged under compression between said retainer wall and said spider, and holding said valve head in fluid sealing engagement with said seat at pressures in said port below a selected yield pressure; a cover of dome shape including a cylindrical skirt portion loosely fitted within said casing between said locking shoulder and said seat unit head, said skirt having an open inner end encircling said valve head, said cover further including an end member at its outer end, facing said throat and providing with a breathing port, a filter screen attached to said end member and covering said breathing port; a locking bar of bow spring form, having end portions fulcrumed against the outer end of said cover and thereby positioned in registration with said locking shoulder for engagement therebeneath; a handle clevis attached to said end member and including a central part overhanding the center of said end member and diametrically spaced legs straddling the central portion of said locking bar; a locking screw threaded through said overhanging central part of the clevis and having an inner end bearing against said central portion of the locking bar for flattening the bar to projecting the ends thereof beneath said locking shoulder; handle means attached to said clevis for lifting said cover; said valve piston including an integral neck projecting from the center of said valve head toward said throat and a knob on the outer end of said neck, and a lifting bar mounted at its ends in said cover skirt, chordally traversing the space therein adjacent said valve piston neck beneath said knob, and engageable with the latter for providing a lost motion valve lifting connection between said cover and said valve piston whereby the lifting of said cover is effective to unseat said valve to a dumping position.

13. A pressure relief and dump valve comprising a cylindrical casing of circular cross section, one end of the casing having an opening formed therein for entry of fluid, the other end of the casing being open to define a discharge throat, means in the casing defining a valve s seat facing said throat, a slide bearing mounted centrally in the casing with a fluid port defined between said bearing and said seat, a poppet valve including a stem slidably mounted in said bearing and a head in axially opposed relation to said seat, means yieldingly loading said poppet valve toward closed position against said seat, and a cover positioned between said poppet valve head and said discharge throat of the casing, said cover including a skirt loosely fitted within said casing and having an open inner end encircling said poppet valve and an outer end member facing said throat, the end member having a breathing port formed therein, and means on the cover for engaging the casing to releasably hold the cover in the casing.

14. A pressure relief and dump valve comprising a casing having inside walls defining a cylindrical chamber, the chamber having an inner end and an outer end, the casing having an opening formed therein at its inner end, the outer end of the casing being open as a discharge throat for the valve, a check valve mounted in the casing at the inner end of the chamber for permitting flow of fluid through the casing only in a direction from the inner end opening of the casing toward the discharge throat, means on the inside walls of the casing defining a locking shoulder facing in a direction toward the inner end of the chamber, a cover unit movable axially in the chamber for covering the check valve, said unit having a breathing port formed therein, a locking bolt mounted on said unit and having an end portion thereof engageable with the locking shoulder, and actuator means on the unit and operatively associated with the locking bolt for moving said end portion of the locking bolt into locking engagement with the shoulder thereby to secure said unit in said chamber.

15. A pressure relief and dump valve comprising an open-ended casing having inside walls defining a cylindrical chamber, the chamber having an inner end and an outer end, the outer end of the chamber being open as a discharge throat for the valve, means defining a check valve in the casing at the inner end of the chamber for permitting flow of fluid through the casing only in a direction from the inner end opening of the casing toward the discharge throat, means on the inside walls of the casing defining a locking shoulder facing in a direction toward the inner end of the chamber, a cover unit movable axially in said chamber for covering the check valve, said unit comprising an end wall extending across the chamber and having an inside surface and an outside surface, a cylindrical skirt extending coaxially in the chamber from the inside surface of the end member, said end chamber having a breathing port formed therein, a locking bolt mounted on the outside surface of the end member, and actuator means on the outside of the end member operatively associated with the locking bolt for moving the locking bolt into engagement with said shoulder thereby to secure said unit in said chamber.

16. A pressure relief and dump valve according to claim 15, in which said chamber and said skirt are of circular cross section, and said check valve means comprises an annular mounting collar extending radially inwardly from the inside walls of the casing, the collar having a circular wall defining an opening extending axially through the collar, a valve seat unit screw-threaded in the wall defining the collar opening, said seat unit having an axially extending opening formed therein, a spring loaded poppet valve seatable on the seat unit, and means yieldingly loading the poppet valve toward closed position against the seat unit, and means on said skirt engageable with said seat unit for unscrewing the seat unit from said mounting collar in a direction toward the discharge throat.

References Cited in the file of this patent

UNITED STATES PATENTS

| | | |
|---|---|---|
| 144,844 | Gould | Nov. 25, 1873 |
| 999,829 | McNutt | Aug. 8, 1911 |
| 1,641,892 | Lane | Sept. 6, 1927 |
| 2,086,969 | Strelow | July 13, 1937 |
| 2,197,271 | Kerrick | Apr. 16, 1940 |
| 2,445,505 | Ashton | July 20, 1948 |
| 2,608,992 | Folmsbee et al. | Sept. 2, 1952 |
| 2,656,852 | Westby | Oct. 27, 1953 |
| 2,821,991 | Marx | Feb. 4, 1958 |

FOREIGN PATENTS

| | | |
|---|---|---|
| 1,058,300 | France | Nov. 4, 1953 |